No. 761,850. PATENTED JUNE 7, 1904.
J. McLEAN.
SCRUB HOOK.
APPLICATION FILED AUG. 5, 1903.
NO MODEL.
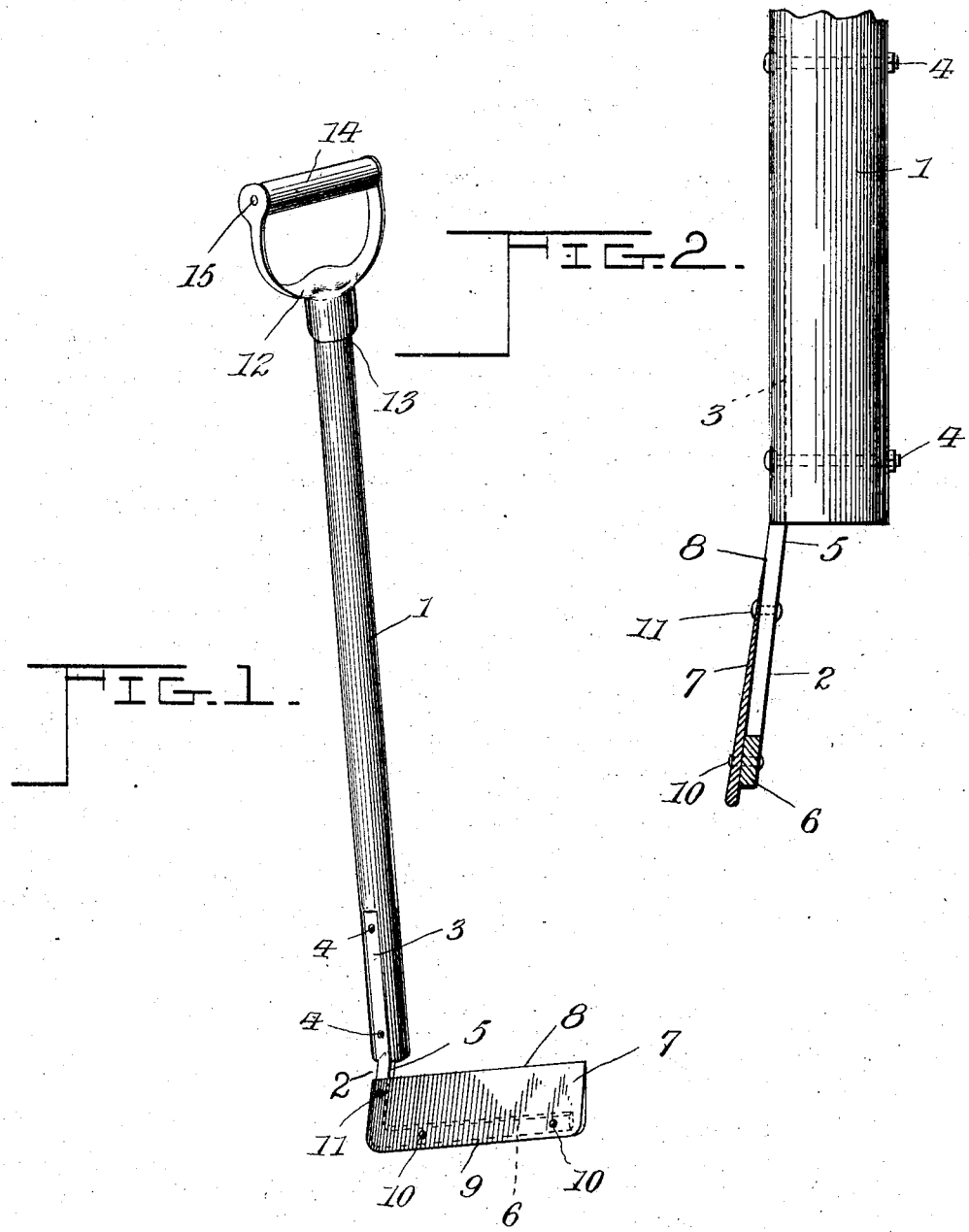
Witnesses:
J. Ed. Page
F. D. Ammen
John McLean, Inventor
By Marion & Marion
Attorneys No. 761,850.

Patented June 7, 1904.

UNITED STATES PATENT OFFICE.

JOHN McLEAN, OF WELWYN, CANADA, ASSIGNOR OF ONE-HALF TO ALBERT EDWARD CHRISTIE, OF MOOSOMIN, NORTH-WEST TERRITORIES, CANADA.

SCRUB-HOOK.

SPECIFICATION forming part of Letters Patent No. 761,850, dated June 7, 1904.

Application filed August 5, 1903. Serial No. 168,320. (No model.)

*To all whom it may concern:*

Be it known that I, JOHN McLEAN, a subject of the King of Great Britain, residing at Welwyn, Assiniboia, North-West Territories, Canada, have invented certain new and useful Improvements in Scrub-Hooks; and I do hereby declare that the following is a full, clear, and exact description of the invention, such as will enable others skilled in the art to which it appertains to make and use the same.

My invention relates to scrub-hooks or grubbing-knives; and the object of the invention is to produce an implement which is especially adapted for clearing away underbrush, such as branches and roots. It is intended to be especially useful in clearing forest-land, and especially in grubbing up the younger growth of wood.

In its general construction the invention comprises a handle and a blade or knife disposed in certain relation to each other.

The invention consists in the construction and combination of parts to be more fully described hereinafter and definitely set forth in the claim.

In the drawings, which fully illustrate my invention, Figure 1 is a perspective of the device. Fig. 2 is a vertical section taken through the blade or knife looking in the direction of the handle.

The same numerals of reference denote like parts throughout the drawings and specification.

Referring more particularly to the parts, 1 represents the handle of the device, which consists, preferably, as shown, of a short stout shaft of wood. At its lower extremity there is attached a foot 2, which comprises a shank 3, which is secured by means of through-bolts 4 in the manner indicated, the said shank being disposed longitudinally at the side of the handle 1. Below the said shank 3 the body 5 of the said foot inclines outwardly in the manner shown and is provided at its extremity with a lateral extension or arm 6, disposed substantially at right angles to the same. To this foot 2 there is attached a short blade or knife 7, having an upwardly-disposed cutting edge 8. The butt 9 of this knife is attached, by means of suitable rivets 10, to the arm 6 aforesaid, and near the edge 8 the same is further secured by means of a rivet 11, which passes through the body 5 of the foot in the manner indicated. It should be understood that the foot 2 and the blade 7 are preferably of steel or similar material.

At the upper extremity of the handle 1 there is attached a head 12, comprising a socket 13, which receives the handle, as shown, the upper portion of which head is provided with a grip or grasp 14, adapted to be seized by the hand of one using the grubbing-knife, the same being secured in place by means of a pin 15 and preferably constructed of wood.

The handle 1 is of such length as to enable a person of average size to seize the grip 14 without stooping when the foot 2 rests upon the ground, and the grip 14 is preferably disposed so that it lies in a plane substantially at right angles to the plane of the blade 7. From this arrangement the implement is well adapted to its purpose, and it should be understood that in using it the cutting edge of the blade would be placed beneath the member to be cut, and an upward force would be exerted, so as to sever the same. The slight inclination given to the blade is important, as it effects a desirable shaving or whittling action where it is necessary to take several cuts with the knife in order to pass through the part.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claim or of mechanical equivalents to the structures set forth.

Having described my invention, what I claim as new, and desire to secure by Letters Patent, is—

An implement of the character described comprising a handle, a foot attached to the lower extremity of said handle and consisting of a shank disposed longitudinally of the handle, said foot, below the body of the shank, being inclined outwardly and provided at its extremity with a lateral extension disposed at substantially right angles to the same, a short blade attached to said foot and having an upwardly-disposed cutting edge, and means securing said blade to both the body of the foot and to said extension, substantially as shown and described.

In witness whereof I have hereunto set my hand in the presence of two witnesses.

JOHN McLEAN.

Witnesses:
M. D. CAVANAGH,
E. L. ELWOOD.